March 14, 1944.  F. B. HOOPER  2,344,304

VENT PIPE VALVE FOR FUEL OIL TANKS

Filed Dec. 30, 1942

F. B. Hooper
INVENTOR.

BY
C. A. Snow & Co.

Patented Mar. 14, 1944

2,344,304

UNITED STATES PATENT OFFICE 2,344,304

VENT PIPE VALVE FOR FUEL OIL TANKS

Frank B. Hooper, Newport News, Va.

Application December 30, 1942, Serial No. 470,617

3 Claims. (Cl. 137—69)

This invention relates to vent valves designed for use in connection with the vent pipe of fuel oil tanks used on shipboard.

The primary object of the invention is to provide a vent valve which will normally be open, but one which closes to exclude water, thereby guarding the fuel oil in the tanks with which the valves are used.

Another important object of the invention is to provide a vent valve of this character which may be manually operated to close the vent pipe, novel means being provided for automatically releasing gas pressure within the tank and pipe, when the pressure exceeds a predetermined degree.

Still another object of the invention is to provide a vent valve which will, in case of fire, guard against flames entering the vent pipes of the tanks.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
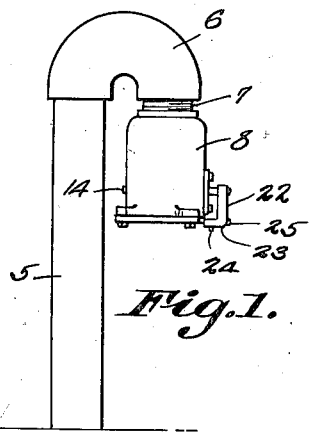
Figure 1 is an elevational view illustrating a vent pipe equipped with a vent valve constructed in accordance with the invention, the vent pipe being shown as extending through the deck of a ship.
Figure 4:
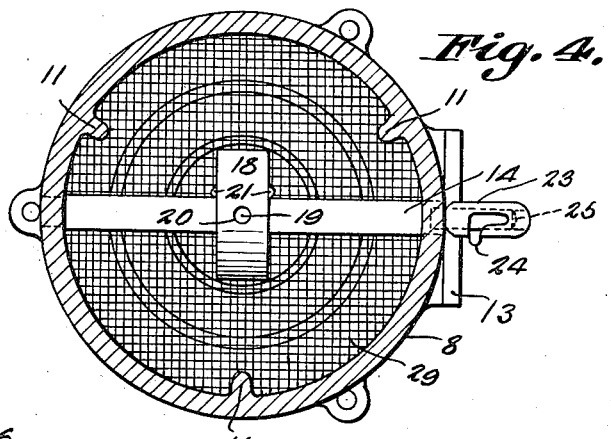
Figure 4 is a sectional view taken on line 4—4 of Figure 2.

Referring to the drawing in detail, the reference character 5 designates the usual fuel oil tank vent pipe, which is shown as extended above the deck of a ship, there being provided a curved fitting 6 secured to the upper end of the pipe, which in turn is supplied with the nipple 7, through which the valve body 8 is connected to the fitting 6.

The valve includes a housing 9 into which the nipple 7 extends, the inner end of the nipple being beveled, providing a valve seat against which the ball valve 10 seats to close the discharge end of the vent pipe.

Formed integral with the inner surface of the wall of the valve housing 9, are vertical ribs 11 that provide a guide for the ball valve 10, and between which the ball valve operates. These ribs operate to hold the valve against lateral movement to insure a true vertical movement of the valve when water enters the open end of the valve housing.

As clearly shown by the drawing, the end of the nipple 7 which extends into the valve housing 9, extends below the upper surface of the housing 9, where it is provided with inclined bores 12 that provide means for permitting air entering the vent pipe 5, to pass therefrom, should conditions arise to cause the ball valve 10 to seat rapidly and compress air in the pipe.

The valve housing is formed with an opening which is normally closed by the plate 13, the opening being sufficiently large to permit the shaft 14 and yieldable ring 18 to be removed from the interior of the housing.

The shaft 14 is shown as having a shoulder that abuts the plate 13, to hold the shaft in position. Bolts 15 pass through openings of the plate 13 and secure the plate in its closed position.

Figures 2, 3:
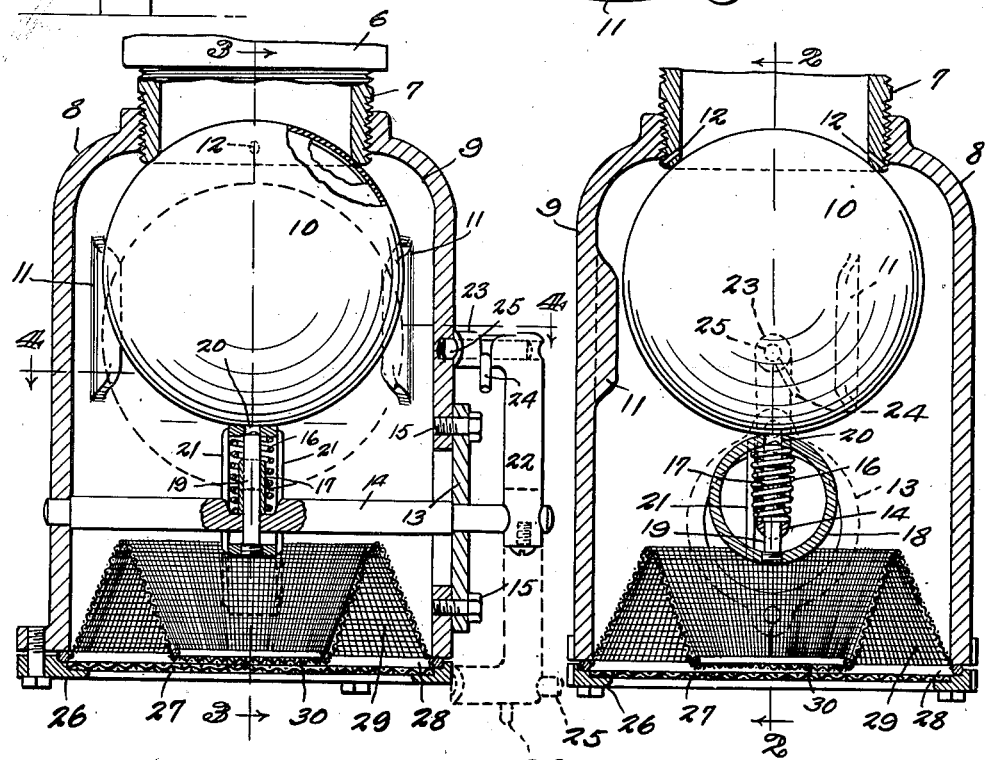
Figure 2 is a vertical sectional view through the valve, taken on line 2—2 of Figure 3.
Figure 3 is a vertical sectional view taken on line 3—3 of Figure 2.

As clearly shown by Figure 2 of the drawing, the shaft 14 is provided with a recess disposed at a point substantially integral with the ends thereof, the recess providing a seat for the coiled spring 16 that surrounds the tubular bearing 17 shown as rising from the recessed portion.

The reference character 18 designates a substantially wide ring formed with an opening, through which the pin 19 extends, the pin 19 being removably secured in an opening of the ring 18, the opening being disposed directly opposite to the opening 20 also formed in the ring. The coiled spring 16 has its outer end bearing against the ring, so that the action of the spring is to normally urge the ring member towards the ball valve 10. In order that lateral movement or twisting of the ring 18, with respect to the shaft 14, will be prevented, vertical rods 21 are provided, which are secured to the edges of the ring 18, the rods being disposed at opposite sides of the ring, and are positioned to contact with the shaft 14 at directly opposite sides.

One end of the shaft 14 extends through the plate 13, and terminates an appreciable distance beyond the plate 13, where it is supplied with the handle 22 that is formed with a right angled end portion 23 of a length to extend to the surface of the housing 9. This right angled end portion 23 is hollow and is provided with a bayonet slot to receive the pin 24 that extends from the sliding bolt 25, that operates in the right angled end portion 23. Thus it will be seen that when the handle has been operated to move the ball valve to its seated position, the sliding bolt may be moved into the recess of the housing 9, locking the shaft against movement.

The reference character 26 designates a supporting ring that is removably secured to the open end of the valve housing, the ring being slightly recessed providing a shoulder for the wire mesh material 27. This ring 26 also provides a support for the ring 28, to which the wire mesh guard 29 is connected. The wire mesh guard 29 embodies spaced walls that converge towards the upper ends thereof and an opening extending centrally therethrough closed by the wire mesh material 30, which is disposed adjacent to the wire mesh material 27, as clearly shown by the drawing. These guard screens act to prevent fire or flames from entering the valve, should a fire occur on the deck of the ship in proximity to the vent valve.

From the foregoing it will be seen that due to the construction shown and described, under normal conditions, the ball valve and handle 22, will take positions as shown in dotted lines in Figure 2. In this position, water entering the housing of the valve, due to sea wash over the deck of the ship, will strike the ball valve, causing it to move to its seating position, as shown in full lines in Figure 2.

Should it be desirable to retain the ball valve 10 in the position as shown by Figure 2, the handle 22 is swung upwardly to the full line position. The ring 18 will act as a cam against the ball valve, urging the ball valve to its seat.

Should excessive pressure within the tank vented by the valve, occur, it is obvious that the pressure directed to the ball valve, would cause the ball valve to move downwardly against the action of the coiled spring 16, unseating the ball valve and relieving the excessive pressure within the tank.

What is claimed is:

1. A vent valve for vent pipes of oil tanks, comprising a valve housing having a valve seat nipple, a ball float valve within the housing adapted to engage the said valve seat, closing the vent valve, a manually controlled valve support embodying a rotatable shaft and a spring pressed member mounted on the shaft, said valve adapted to rest on the spring pressed member, said spring pressed member providing a cam adapted to move the valve to its seat when the shaft is rotated to one position, and said ball valve adapted to move from its seat against the action of the spring member, relieving gas pressure in the seat nipple.

2. A vent valve for vent pipes of tanks, comprising a valve housing having a valve seat nipple at its upper end, a horizontal shaft extending through the housing, a ball float valve disposed within the housing between the shaft and valve seat, and adapted to engage said valve seat closing the discharge end of the seat nipple, a ring member disposed intermediate the ends of the shaft and through which the shaft extends, yieldable means disposed within the ring member and arranged between the ring member and shaft, whereby the ring member is moved to a position offset with respect to the axis of the shaft, providing a valve-engaging cam, and a handle by means of which the shaft is rotated, and said ring member adapted to engage the ball valve and move the ball valve to its seat.

3. A vent valve for vent pipes of oil tanks, comprising a valve housing having a valve seat secured to the discharge end of a seat nipple, a ball float operating within the housing and adapted to float to a seat closing the vent valve, a shaft extended horizontally through the housing, a valve-operating cam embodying a ring member through which the shaft extends, a pin secured within the ring member and being extended through an opening of said shaft, securing the ring member to the shaft, a coiled spring encircling the pin and being disposed between the shaft and inner surface of the ring member and adapted to urge the ring member into engagement with the ball valve, and said ball valve adapted to move against the action of said spring member unseating said valve under excessive air pressure, and a handle on one end of the shaft whereby said shaft and valve are manually operated to move the valve to its seat.

FRANK B. HOOPER.